US012761966B2

(12) United States Patent
Gaikwad et al.

(10) Patent No.: US 12,761,966 B2
(45) Date of Patent: Oct. 13, 2026

(54) REAL-TIME RESOURCE ALLOCATION FRAMEWORK

(71) Applicant: Bank of America Corporation, Charlotte, NC (US)

(72) Inventors: Makarand Gaikwad, Mumbai (IN); Venugopala Rao Randhi, Hyderabad (IN); Ramkumar Mudundi, Hyderabad (IN); Kalpesh Salot, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 439 days.

(21) Appl. No.: 18/414,113

(22) Filed: Jan. 16, 2024

(65) Prior Publication Data

US 2025/0231814 A1 Jul. 17, 2025

(51) Int. Cl.
*G06F 9/50* (2006.01)

(52) U.S. Cl.
CPC .......... *G06F 9/5044* (2013.01); *G06F 9/5033* (2013.01); *G06F 9/5038* (2013.01)

(58) Field of Classification Search
CPC ..... G06F 9/5044; G06F 9/5038; G06F 9/5033
See application file for complete search history.

(56) References Cited

U.S. PATENT DOCUMENTS 6,493,797 B1 12/2002 Lee et al.
7,325,234 B2 1/2008 Smith
8,856,048 B2 10/2014 Calcaterra et al.
8,903,983 B2 12/2014 Bakman et al.
9,270,539 B2 2/2016 Ammerman et al.
9,274,850 B2 3/2016 Gohad et al.
9,430,287 B2 8/2016 Zaroo
(Continued)

FOREIGN PATENT DOCUMENTS

TW 202024902 A * 7/2020 ........... G06F 9/3858

OTHER PUBLICATIONS

Chennupati et al., 2018. Machine Learning Enabled Scalable Perfor mance Prediction of Scientific Codes. In Woodstock '18: ACM Symposium on Neural Gaze Detection, Jun. 3-5, 2018, (Year: 2018).*

*Primary Examiner* — Lewis A Bullock, Jr.
*Assistant Examiner* — Kevin X Lu
(74) *Attorney, Agent, or Firm* — Banner & Witcoff, Ltd.

(57) ABSTRACT

Various aspects of the disclosure relate to identification and analysis associated with real-time resource allocation for code execution. A real-time resource allocation framework may estimate computing resource utilization for any given codebase using various models in real-time. The framework captures metadata corresponding to each codebase to be supported by the real-time resource allocation framework using a crawler that performs an initial full scan of all codebases and a later incremental scan for any changes in codebases onboarded onto framework to identify atomic code blocks in each of the codebases, to categorize those code blocks with respect to various computing resource utilization parameters and to predict an expected value for each code block for any given parameter. Blockchain and smart contract technology enables operation of each atomic code block to provide services via an enterprise network and feedback of actual values to improve prediction capabilities.

17 Claims, 8 Drawing Sheets

(56) References Cited

U.S. PATENT DOCUMENTS

| | | | | |
|---|---|---|---|---|
| 9,806,956 | B1 | 10/2017 | Maxwell et al. | |
| 11,496,413 | B2 | 11/2022 | Larsson et al. | |
| 2009/0007120 | A1 | 1/2009 | Fenger et al. | |
| 2014/0289734 | A1 * | 9/2014 | Adams | G06F 9/4881<br>718/104 |
| 2019/0319861 | A1 * | 10/2019 | Pan | H04L 41/5019 |
| 2023/0221992 | A1 * | 7/2023 | Decrop | G06N 3/082 |
| 2023/0409400 | A1 * | 12/2023 | Balderas | G06F 9/5033 |
| 2024/0062104 | A1 * | 2/2024 | Kogan | G06N 5/01 |
| 2024/0160491 | A1 * | 5/2024 | Taneja | G06Q 10/0631 |

* cited by examiner

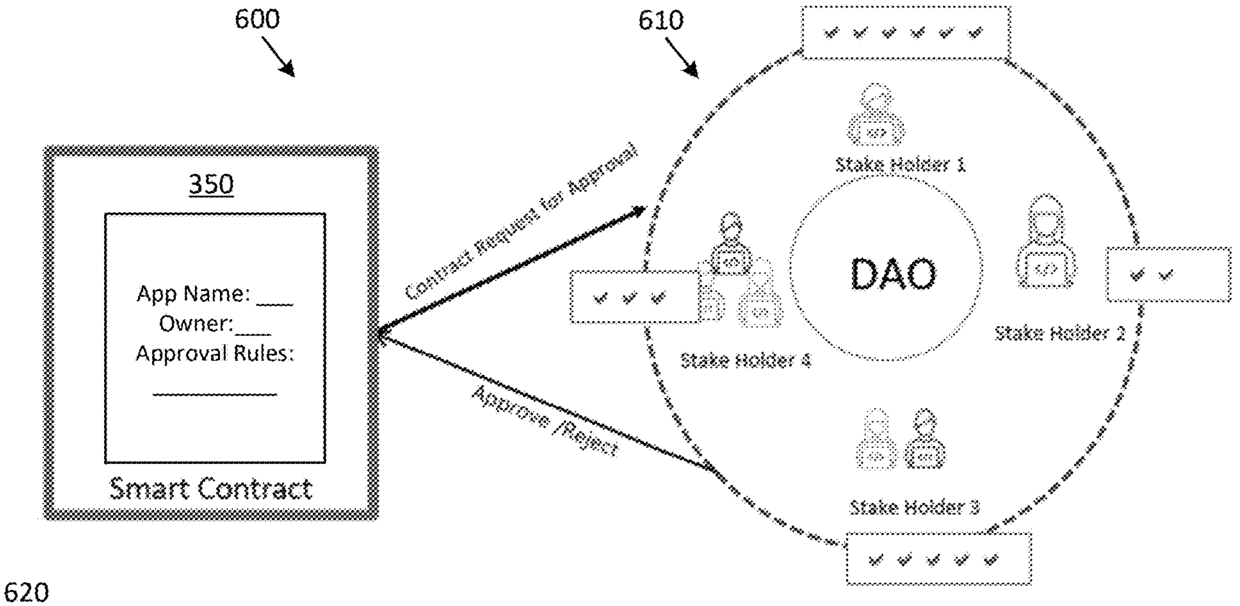

620

The voting rights of all the involved stakeholders recalibrated each time based on the scenario.
increase or decrease the weightage points based on the feedback loop whether contract is executed as expected or not

| Team/Contract Type | Appraiser(SH1) | AppOwner(SH2) | Resource Team(SH3) | Business(SH4) |
|---|---|---|---|---|
| Contract 1(Budget) | 30% | 40% | 5% | 25% |
| Contract2(SLA) | 25% | 50% | 25% | 0% |

| Stake Holder(SH) /Clauses | Appraiser (SH1) | AppOwner(SH2) | Resource Team(SH3) | Business (SH4) |
|---|---|---|---|---|
| Clause 1(95% Cost) | 40% | 60% | 90% | 0% |
| Clause 2(No Resources) | 20% | 10% | 0% | 35% |
| Clause 3(Availability) | 15% | 20% | 10% | 25% |
| Clause 4(Issues less) | 25% | 10% | 0% | 40% |
| | 100% | 100% | 100% | 100% |

630

FIG. 6

REAL-TIME RESOURCE ALLOCATION FRAMEWORK

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, using both on-premises and cloud computing resources, it may be difficult for such an organization, such as a financial institution, to manage its computing resources efficiently, effectively, securely, and uniformly. For example, when multiple enterprise teams run code within an on-premises server environment, a usage spike in the CPU processing and memory usage may be seen or, in some cases, server resources may be idle, waiting for new requests. As such, computing resources, such as CPU, memory, and the like may not be optimally utilized.

In some cases, a CPU cache hit may be missed during any code block execution that may result in greater CPU processing times, which may increase exponentially when large amounts of data are fetched from either a local storage device (e.g., a hard disk drive (HDD) or random-access memory (RAM)). This may result in longer wait times for outputting expected results of the code block execution, thus making the current processes not scalable.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. A general aspect includes real-time estimation of central processing unit (CPU) operation, memory use, cache use, network use, and/or other resources for any given code base.

Aspects of the disclosure relate to computer hardware and software. In particular, one or more aspects of the disclosure generally relate to identification and analysis for real-time resource allocation for code execution.

The real-time resource allocation framework may estimate resource (e.g., CPU, memory, cache, network, HDD, solid state drive (SSD), and the like) utilization for any given codebase using various models (e.g., a natural language processing (NLP) model, a CPU utilization model, a memory utilization model, and/or the like) in real-time. The framework, as a first step may capture metadata corresponding to each codebase to be supported by the real-time resource allocation framework. The real-time resource allocation framework may include a crawler component to connect to different codebases identified in the metadata. The crawler may explore all the codebases onboarded to the real-time resource allocation framework. The crawler may be configured to perform an initial full scan of all codebases and a later incremental scan for any changes in codebases onboarded onto framework. The real-time resource allocation framework may utilize a natural language processing engine and/or an artificial intelligence/machine learning (AI/ML) engine to identify atomic code blocks in each of the codebases, to categorize those code blocks with respect to various parameters associated with risk management, CPU utilization, memory utilization, I/O utilization, security level agreements (SLA) with cloud computing services, and the like, and to predict an expected value for each code block for any given parameter.

The real-time resource allocation framework may create and/or manage decentralized autonomous organization (DAO) smart contracts between various stakeholders regarding code block parameters values and resource requirements of those code blocks. The code blocks that need validation of parameter values based on smart contracts may be sent to containers to test the atomic code blocks for actual parameter values during performance, where the identified actual values will be sent to stakeholders for approval. The real-time resource allocation framework may also utilize another smart contract between relevant stakeholders to manage resource availability and/or blocking of the resources for operation. Once the contract is approved the real-time resource allocation framework may optimally block the resources, while ensuring that dependent data is also available by preloading before code block execution.

As discussed above, the AI/ML engine may utilize one or more models to predict or otherwise calculate expected or predicted resource use by analyzed code segments, such as a CPU model (e.g., CPU (0)), a memory model (e.g., Mem(0)), a network model (NET(0)), and the like. Each model may process parameters associated with the resource and/or with the code segments. For example, the CPU model may predict processing cycles performed by a processor (e.g., a CPU, a graphics processing unit (GPU), a tensor processing unit (TPU)) when processing instructions on an examined code block. For example, the CPU(0) model may be used to calculate the operation cycles for a CPU, TPU, and/or GPU for a particular code block (e.g., an atomic code block). The model may predict CPU operations for an atomic code block corresponding to normal code operation such as data loading (e.g., for an online transaction processing (OLTP)), predict GPU operations for an atomic code block for online analytical processing (OLAP), processing graphs and/or charts, chart building, processing graphics and/or videos and/or the like, and for TPU operations for atomic code blocks involving processor intensive data science operations, such as for deep learning and/or machine learning applications. The CPU(0) model may also calculate or otherwise predict a number of cores required either parallel (e.g., for threading/degree or parallelism), or sequential (e.g., singleton transactions) processing atomic code blocks. A memory model, e.g., Mem(0), may be processed to determine and/or predict memory requirements and/or cache speed for atomic code blocks based on parameters such as, for example, a first-time cache hit ratio. The parameters may include cache filters that may be used for cache over writing capabilities, the first-time cache hit ratio and/or time to load data into memory from a storage device (e.g., a HDD, an SDD, and the like), a variable size, a data set size, and the like. A network model, e.g., Network(0), may be used to determine and/or predict bandwidth sharing and/or configurations for atomic code blocks and may depend on certain parameters such as a data size for read, write, import, and/or export of each atomic code block.

In some cases, the real-time resource allocation framework may include the AI/ML learning engine that leverages NLP to process various models (e.g., a CPU(0) model, a Mem(0) model, a Network(0) model and/or other algorithms) to estimate CPU cycle loading characteristics and/or memory requirements for any given code block. The model algorithms may be capable of testing atomic code blocks in different sizes of containers to improve the accuracy of the predictions. In some cases, a dynamic smart contract may be created between various stakeholders to order and/or reserve particular resources (e.g., CPU, GPU, TPU, memory, cache, network resources, storage devices, and the like) required by the systems processing the atomic code blocks. In some cases, an ability to override a cache filter may avoid "one-hit wonders" occupying caches when executing required objects and/or data in advance more than once when attempting to ensure availability of particular data or data objects when required by the atomic code blocks. The real-time resource allocation framework may manage resource usage statistical details by tracking this information in a blockchain for use in future and/or similar applications.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 6 and 7 show an illustrative process for smart contract approval and real-time resource management in accordance with one or more aspects described herein.

DETAILED DESCRIPTION

Figure 1A:
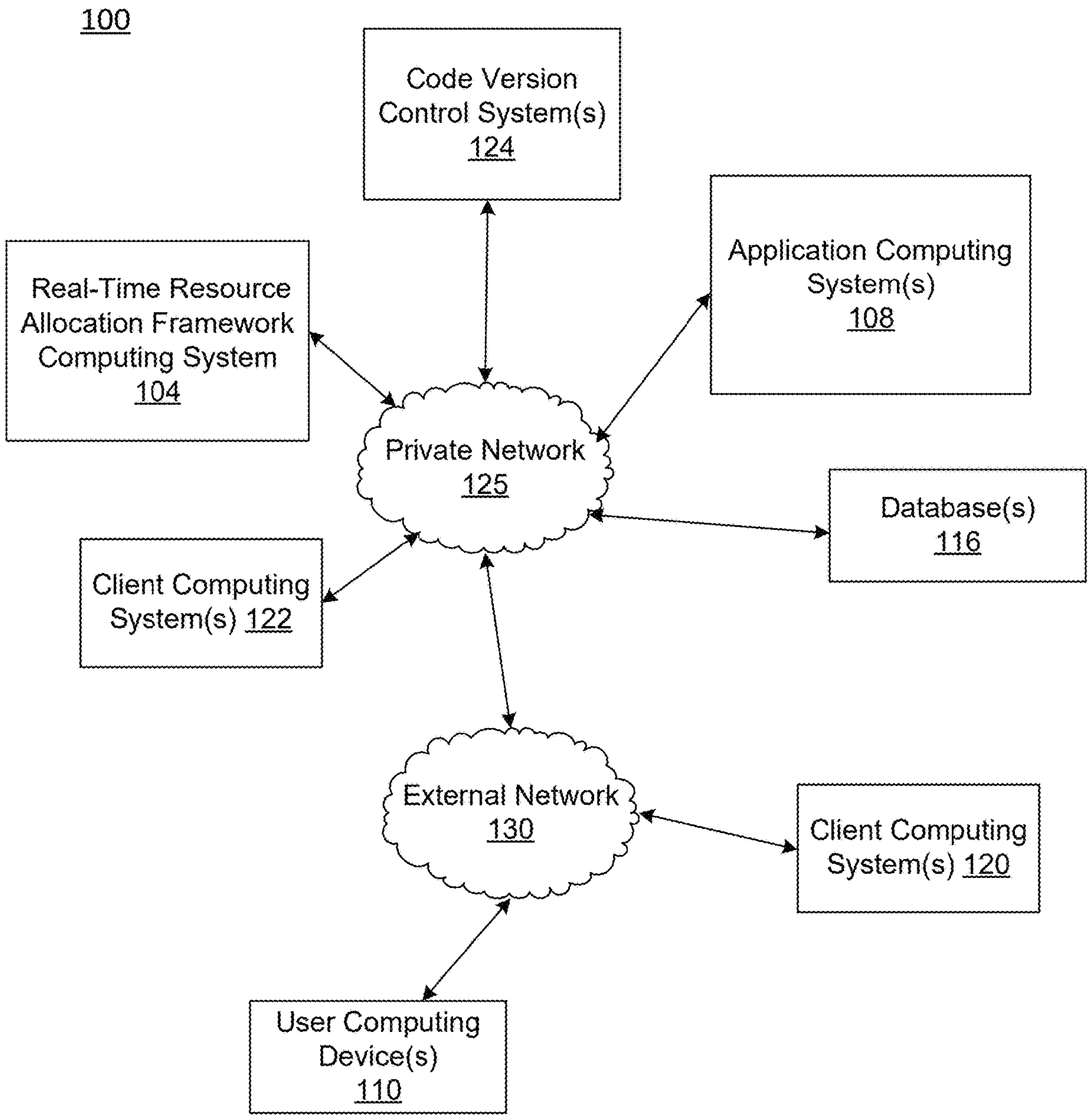
FIG. 1A shows an illustrative computing environment for real-time prediction and management of computing resources in an enterprise network, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

While some current systems may perform some sort of cache performance prediction and scheduling on commodity processors with shared caches and/or provide some priority aware selective cache allocation, complex computing systems may involve many interconnected pieces that may not be accounted for during the cache allocation thus causing unexpected processing delays. The real-time resource allocation framework includes the ability to predict usage requirements for multiple processor types including one of or a combination CPUs, GPUs and TPUs to address a broader code use case, including increasingly complex operations such as those for processing generative models, large language model (LLM) models, statistical models, and/or the like. The real-time resource allocation framework may be capable of performing a full scan of executable code of atomic code blocks (e.g., a onetime code scan) with incremental changes to predict containers size, to allow stake holders information about code execution requirements about what it will take to order and execute each atomic code block, either alone or in combination. An apprise CPU framework may be configured manage signatures by one or more a stake holders to smart contracts in real-time with respect to one or more features, such as a security scan, encryption and/or decryption, loading and/or unloading of caches, and the like. Additionally, the real-time resource allocation framework creates containers capable of scheduling computing loads irrespective of size, such as by loading a cache based on SLA and risk versus stake holders having no controls.

In some cases, the real-time resource allocation framework may utilize smart contracts to manage predicted values associated with each atomic code block, where a link to a smart contract may be sent to stake holders corresponding to a specified contact. Each stake holder acts on the smart contact, based on their clauses and/or priorities. The real-time resource allocation framework may act on a smart contract associated with one or more code blocks based on stake holder approval and whether or not a specified weighting threshold has been met corresponding to various system resource requirements. The real-time resource allocation framework may leverage blockchain technologies to manage predictions and/or feedback associated with operation of each atomic code block. Each block of the blockchain may be associated with operation of a particular atomic code block and may include information associated with predicted and/or historical resource utilization. A blockchain may be associated with an atomic code block and/or a particular resource. For example, a blockchain associated with an atomic code block may include blocks associated with resource utilization corresponding to execution of the atomic code block. In some cases, each atomic code block may have a blockchain associated with each particular resource, such as a processor utilization blockchain, a memory utilization blockchain, a network resource utilization blockchain, and/or the like. The blocks in the blockchain may include information such as a unique address and/or name of a resource, usage information for each atomic block (e.g., a histogram, a chart, a table, and the like), resource cost at a point in time, reuse dependency information, and/or the like.

The real-time resource allocation framework may process one or more algorithms and/or models (e.g., a NLP algorithm, a CPU(0) model, a Mem(0) model, and the like) in real-time. A natural language processing, machine learning and/or artificial intelligence module may estimate needs of core network resources (e.g., server resources such as processor resources, memory resources, network resources) for given any code base, where execution may be facilitated using a code base crawler technique for any code repository. The code base crawler may be used as part of an initial as first steps, where the NLP, AI, and/or ML algorithm may predict for the expected atomic blocks with parameters values like risk, CPU, SLA, and memory. The real-time resource allocation framework may use smart contracts to facilitate seeking and confirming approval for using weightings associated with resource use parameters to allow for scheduling of application operation within the enterprise network. For example, upon smart contract verification and approval of parameters values and/or resources needs, the real-time resource allocation framework is ready to create containers and test the atomic code blocks. In this way, the server's resources may be utilized optimally and keeping application operation priority needs in mind before executing any code blocks with meeting SLA expectations. For example, the real-time resource allocation framework may resources ready to execute code blocks to predict resource needs and acquire upon approval and the ability to trigger application runtime execution to release resources on a predicted needs basis, while collecting operational statistics to continually train the resource models, while preparing a next code block to use the same resources again.

The real-time resource allocation framework may analyze an application to identify atomic code blocks and set the parameters for predicting resource use requirements. An apprise portion of the framework may collect the latest code from version control for use in real-time atomic module prediction functionality based on existing runtime data, to allow for automatic analysis of real-time updates to the application code. Various NLP-based analysis scenarios, such as, for example, lexical, syntactic, and/or semantics may be performed on existing data for predicting CPU, GPU, and TPU cycle needs, memory utilization requirements, disk and other input/output access, network access, and the like, and/or may be used when performing associated risk identification tasks. Predicated values may be presented to stake holders via a portion of a smart contract, where the predicted values may be automatically compared with actual containers values.

The real-time resource allocation framework may perform preloading of caches and perform risk mitigation activities. For example, output of atomic code block prediction data feeds may be used by an apprise CPU and Memory framework to allow stake holders to sign smart contracts to order resources in real-time with buffers and SLA, to enable security scans, and/or perform encryption and decryption portions of a risk migration process. Based on the job run times, the real-time resource allocation framework may check a cache hit ratio and/or filters. To overcome any predicted latency issues, required data may be loaded in advance into a cache. After the process is run, the real-time resource allocation framework may clean the cache to prepare for the next process operation. The real-time resource allocation framework may store resource utilization details in one or more blockchains which may be used to continually train resource use prediction models. For example, a blockchain may be used to save the job application, and/or batch operation details such as, for example, day, time, resources required, usage, duration, cost, maintenance activity details, risk scope details, data, ports and the like. Such information may be used in future operations and to improve tracking.

FIG. 1A shows an illustrative computing environment 100 for real-time resource allocation, in accordance with one or more arrangements. The computing environment 100 may comprise one or more devices (e.g., computer systems, communication devices, and the like). The computing environment 100 may comprise, for example, a real-time resource allocation framework computing system 104, one or more code version control systems 124, one or more application computing systems 108, and/or one or more data repositories, such as the database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the real-time resource allocation framework computing system 104 as a stand-alone computing system, the real-time resource allocation framework computing system 104, or portions of the real-time resource allocation framework computing system 104, may be implemented within one or more separate computing systems.

The real-time resource allocation framework computing system 104 may comprise one or more computing devices and/or other computer components (e.g., processors, memories, communication interfaces) configured to perform one or more functions as described herein. Further details associated with the architecture of the real-time resource allocation framework computing system 104 are described with reference to FIG. 1B.

The application computing systems 108 may comprise one or more computing devices and/or other computer components (e.g., processors, memories, communication interfaces). In addition, the application computing systems 108 may be configured to host, execute, and/or otherwise provide one or more enterprise applications. In some cases, the application computing systems 108 may host one or more services configured facilitate operations requested through one or more application programming interface (API) calls, such as data retrieval and/or initiating processing of specified functionality. In some cases, a client computing system may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing system and/or the application computing systems 108 may comprise various servers and/or databases that store and/or otherwise maintain account information, such as financial account information including account balances, transaction history, account owner information, and/or other information. In addition, the client computing system and/or the application computing systems 108 may process and/or otherwise execute transactions on specific accounts based on commands and/or other information received from other computer systems comprising the computing environment 100. In some cases, one or more of the client computing system and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The one or more code version control systems 124 may store versions of code that is compiled to provide one or more applications, such as the applications running on the one or more application computing systems 108. The one or more code version control systems 124 may allow the real-time resource allocation framework computing system 104 to crawl code information stored in the one or more code version control systems 124 and/or the databases 116 to identify atomic code blocks associated with one or more applications that may run on the application computing systems 108 so that the real-time resource allocation framework computing system 104 may predict and otherwise manage resource availability of hardware components of the application computing systems 108, network systems, memory storage devices, input/output (I/O) devices, and the like. The database(s) 116 may comprise one or more computer-readable memories storing information that may be used by the real-time resource allocation framework computing system 104. For example, the database(s) 116 may store resource prediction models, blockchain information, historical resource performance information, electronic contact information, and the like. In an arrangement, the database(s) 116 may be used for other purposes as described herein. In some cases, the real-time resource allocation framework computing system 104, the one or more code version control systems 124, and/or the client computing system 120 may write data or read data to the database(s) 116 via the services.

In one or more arrangements, the real-time resource allocation framework computing system 104, the application computing systems 108, the one or more code version control systems 124, the client computing system 120, the user devices 110, the databases 116, and/or the other devices/systems in the computing environment 100 may be any type of computing device capable of receiving input via a user interface, and communicating the received input to one or more other computing devices in the computing environment 100. For example, the real-time resource allocation framework computing system 104, the application computing systems 108, the one or more code version control systems 124, the client computing system 120, the user devices 110, the databases 116, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the real-time resource allocation framework computing system 104, the application computing systems 108, the one or more code version control systems 124, the client computing system 120, the user devices 110, the databases 116, and/or the other devices/systems in the computing environment 100 may, in some instances, be and/or comprise special-purpose computing devices configured to perform specific functions.

Figure 1B:
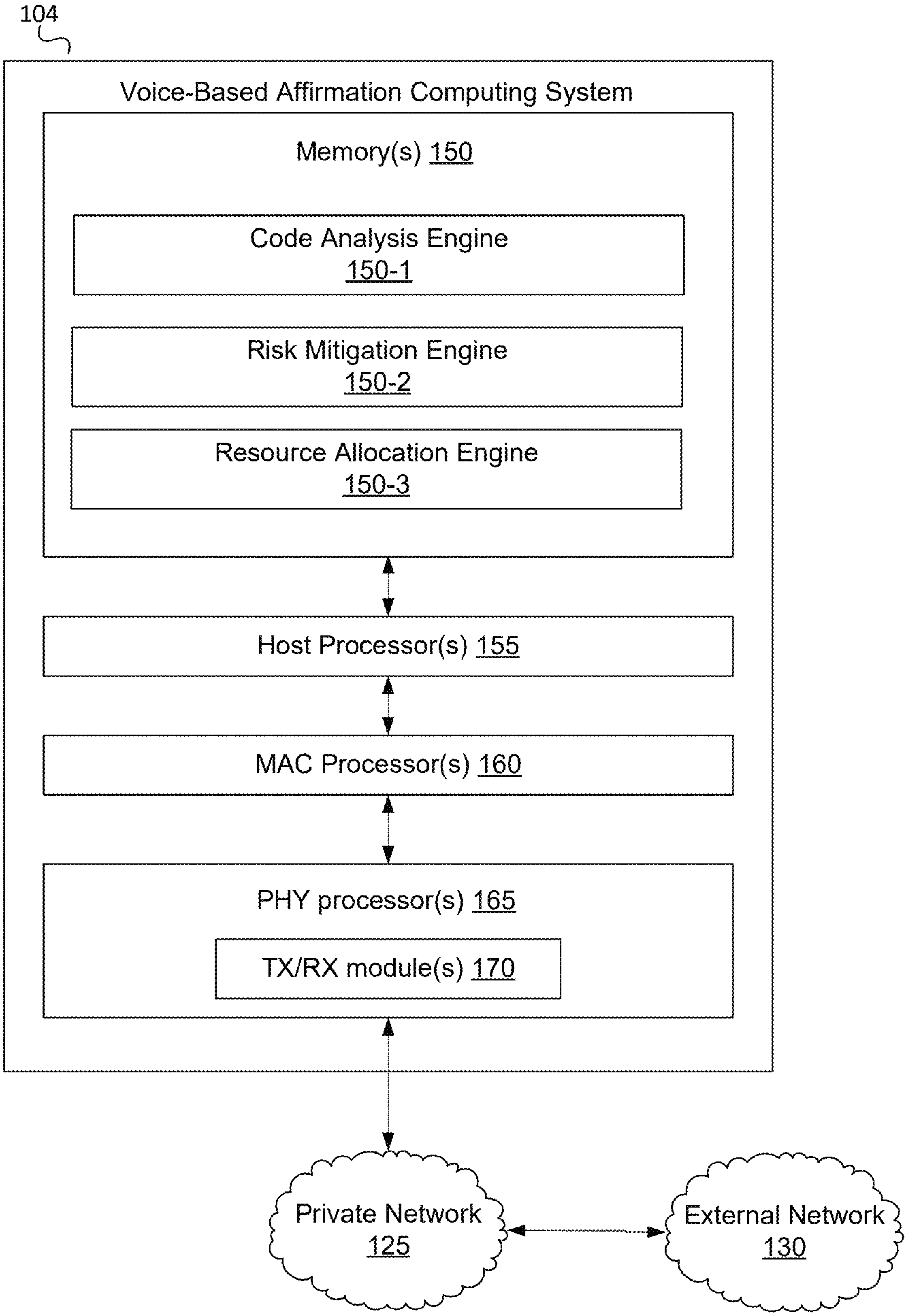
FIG. 1B shows an illustrative computing platform enabled for real-time prediction and management of computing resources in an enterprise network, in accordance with one or more aspects described herein.

FIG. 1B shows an illustrative real-time resource allocation framework computing system 104 in accordance with one or more examples described herein. The real-time resource allocation framework computing system 104 may be a stand-alone device and/or may at least be partial integrated with one or more computing systems and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The real-time resource allocation framework computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the real-time resource allocation framework computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

Figure 3:
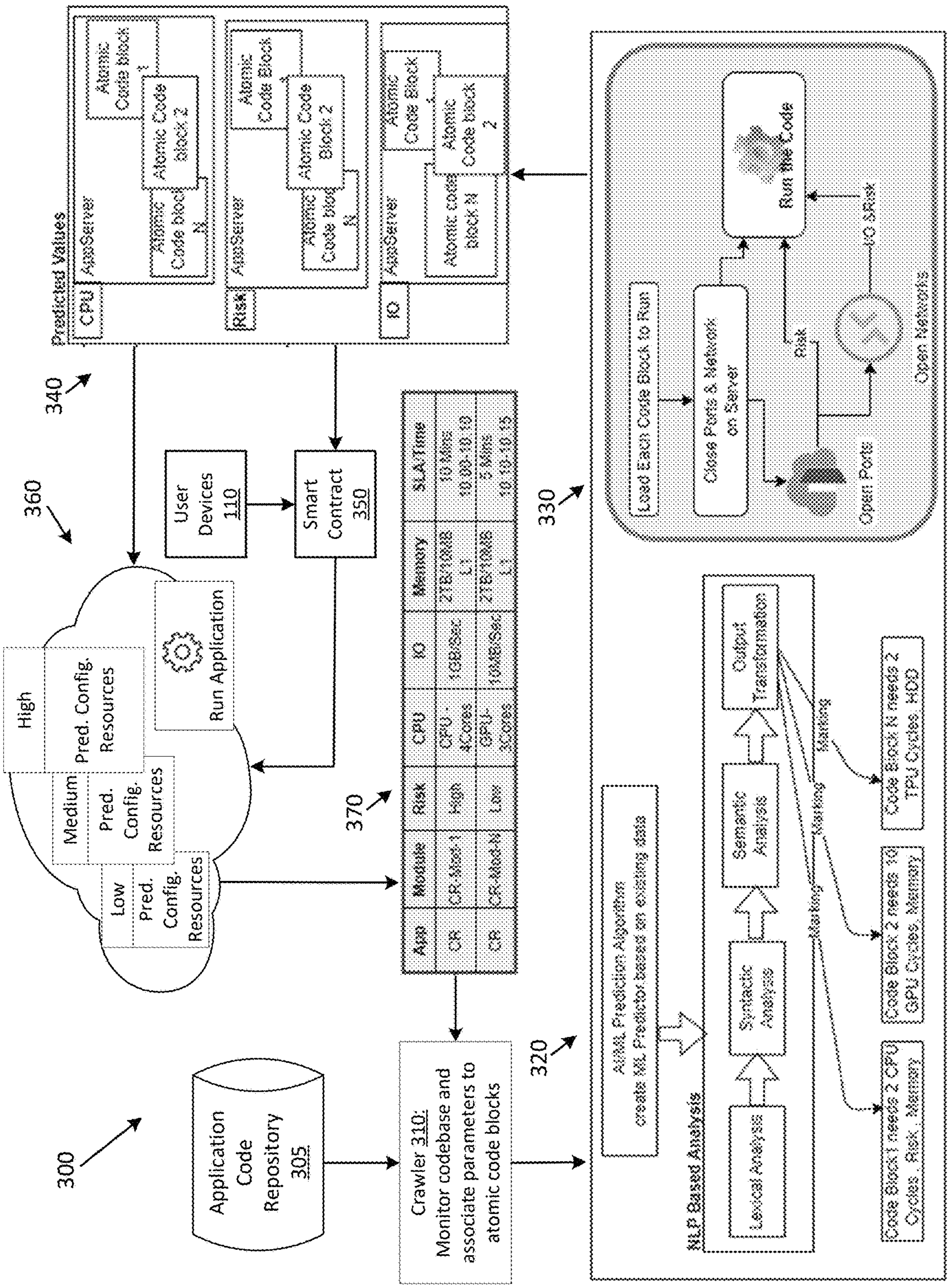
FIG. 3 show an illustrative process for identifying atomic code blocks of any code base and setting parameters for real-time prediction of computing resource usage, in accordance with one or more example arrangements.
Figure 4:
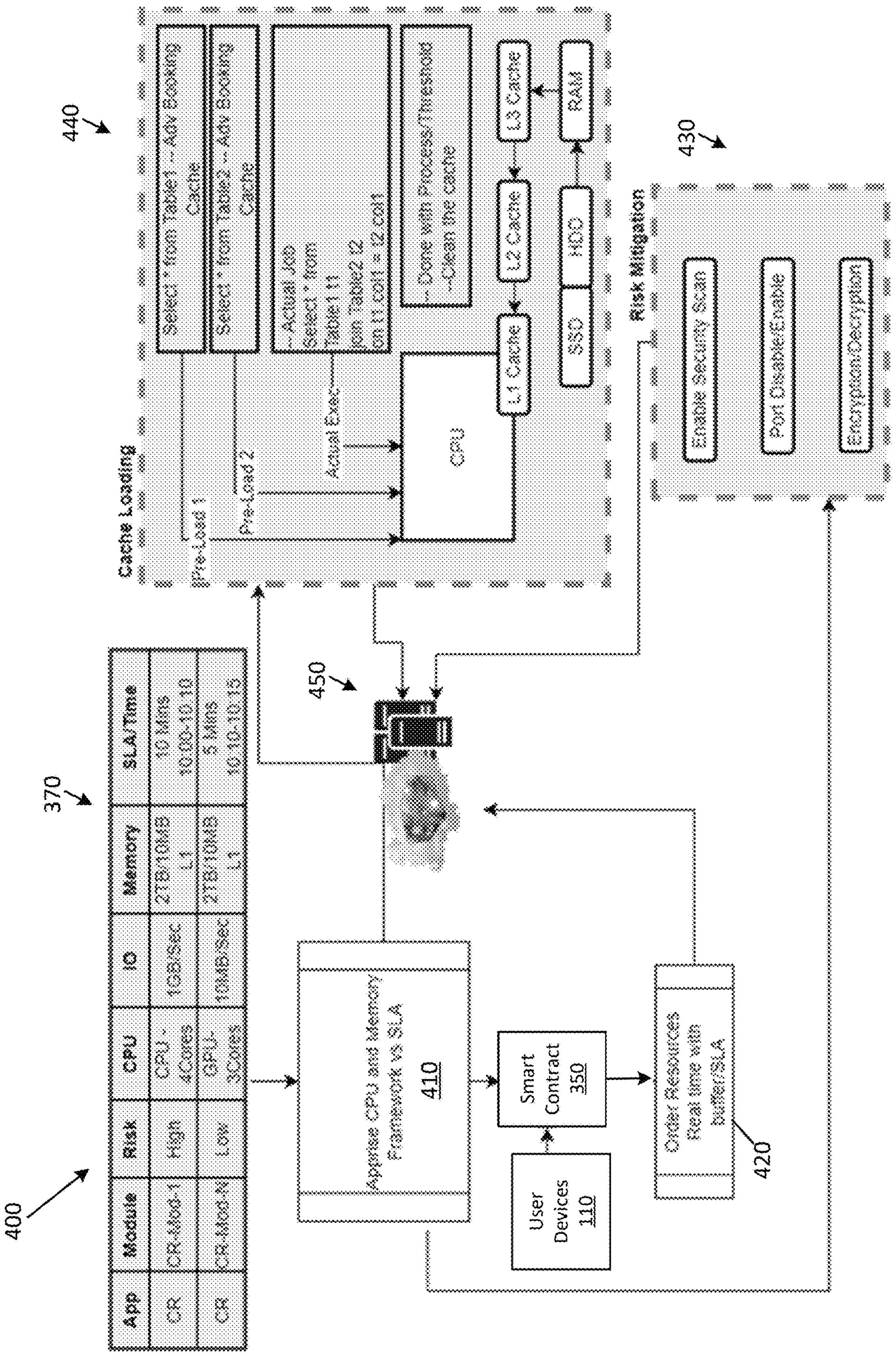
FIG. 4 shows an illustrative process for preloading of cache information and risk mitigation for managing network resources in accordance with one or more aspects described herein.
Figure 5:
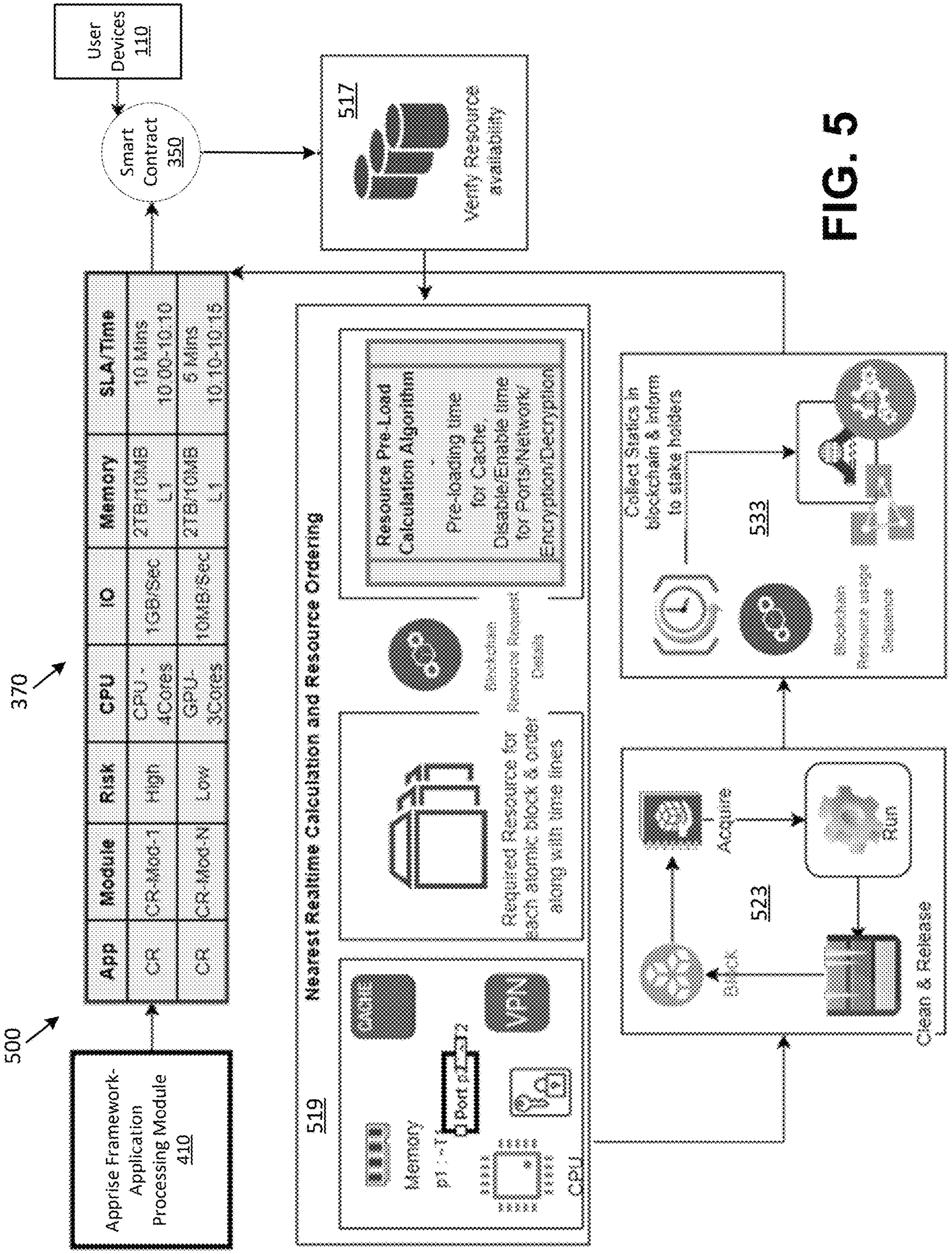
FIG. 5 shows an illustrative process for smart contract-based ordering and tracking of resources in real-time in accordance with one or more aspects described herein.

One or more processors (e.g., the host processor(s) 155, the MAC processor(s) 160, the PHY processor(s) 165, and/or the like) of the real-time resource allocation framework computing system 104 may be configured to execute machine readable instructions stored in memory 150. The memory 150 may comprise (i) one or more program modules/engines having instructions that when executed by the one or more processors cause the real-time resource allocation framework computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the real-time resource allocation framework computing system 104 and/or by different computing devices that may form and/or otherwise make up the real-time resource allocation framework computing system 104. For example, the memory 150 may have, store, and/or comprise a code analysis engine 150-1, a risk mitigation engine 150-2, a resource allocation engine 150-3, and/or the like. The code analysis engine 150-1 may have instructions that direct and/or cause the real-time resource allocation framework computing system 104 to perform one or more operations associated with real-time code analysis to identify atomic code blocks and identify resources utilized by that code, along with identifying parameter values for processor cycles, risk, I/O use, network use, and the like for use in prediction analysis based on different loading levels of the enterprise network, as shown in FIG. 3. The risk mitigation engine 150-2 may have instructions that may cause the real-time resource allocation framework computing system 104 to perform preloading of cache information and perform risk mitigation of potential security threats associated with each atomic code block based on real-time approval from stakeholders via smart contract operation, as shown in FIG. 4. The resource allocation engine 150-3 may have instructions that direct and/or cause the real-time resource allocation framework computing system 104 to perform one or more operations associated with ordering resources for application operations based on real-time operation of atomic code blocks of the application and tracking actual resource loading values via blockchains, and the like, as shown in FIG. 5.

While FIG. 1A illustrates the real-time resource allocation framework computing system 104 and/or the application computing systems 108, as being separate elements connected in the private network 125, in one or more other arrangements, functions of one or more of the above may be integrated in a single device/network of devices. For example, elements in the real-time resource allocation framework computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, one or more of the application computing systems 108.

Figure 2:
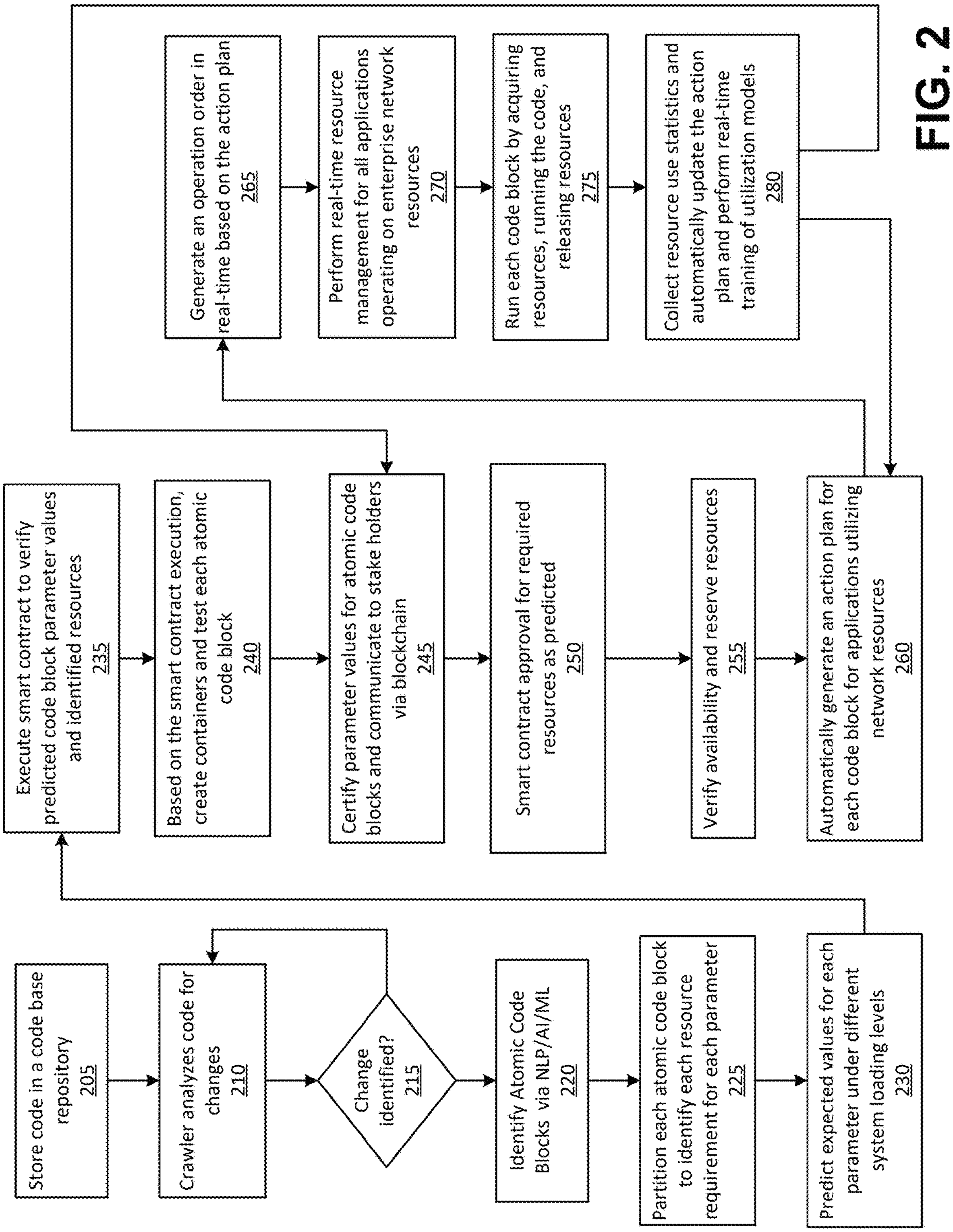
FIG. 2 shows an illustrative process for real-time prediction and management of computing resources in an enterprise network in accordance with one or more aspects described herein.

FIG. 2 shows an illustrative process for real-time prediction and management of computing resources in an enterprise network in accordance with one or more aspects described herein. Software development for services and applications provided by an enterprise organization is performed as a continuing process where additional features and/or defect resolutions may be provided via patches or new releases. In doing so, developers check in changes into a code base repository (e.g., one or more code version control systems 124) at 205. The real-time resource allocation framework computing system 104 may include a crawler (e.g., a crawler 310 shown in FIG. 3) to identify changes to checked in code and/or may receive an update (e.g., a check-in event notification) via the private network 125. Because some of the one or more code version control systems 124 may not provide check-in event notification, the crawler may be configured to crawl multiple code bases stored in the one or more code version control systems 124 to identify changes from previous versions of applications or services provided by the enterprise organization via the one or more application computing systems 108 and/or the client computing systems 122 and 122. Additionally, because the enterprise organization's provided applications, products and/or services may share common software components to provide common functionality across different applications, the crawler may identify a code change in the one or more code version control systems 124 that may impact a plurality of applications, such that each of the plurality of applications may be affected by the change, where the changes may have an effect on an amount of computing resources (e.g., processor cycles, processor times, network access, local memory access, input/output access, memory device access, SLA impact, and the like) that each application consumes. The crawler may operate continuously and/or periodically to crawl the code base to identify changes to the code base. If, at 215, the crawler does not identify a change to the code base, the crawler may wait for the next periodic crawl start time and/or resume the continuous crawling of the code base at 210. If, at 215, a change is identified by the crawler, the real-time resource allocation framework computing system 104 may begin processing of code associated with the change, where the code may comprise an application, a service, a function, an object, and/or other consumable code objects that may be run by the enterprise network computing devices to provide products and/or services via the enterprise network, such as by identifying atomic code blocks associated with the changed code to identify associated resources involved when the code is operational on the computing network at 220.

For example, at 200, the real-time resource allocation framework computing system 104 may parse the code to identify atomic code blocks of functionality affected by the change, where an application or service comprises a sequence of operation where atomic code blocks are run in series (or parallel) operation on the computing resources to provide desired functionality. At 225, the real-time resource allocation framework computing system 104 may partition each atomic code block to identify each resource requirement for each parameter, where parameters include a processor use parameter (e.g., CPU use, TPU use, GPU use, and the like), a memory use parameter (e.g., a local cache memory parameter, a network cache memory parameter, a RAM access parameter, a ROM access parameter, and the like), a risk parameter (e.g., a network security risk parameter), an I/O use parameter, a SLA use impact parameter (e.g., a SLA time parameter), and the like. At 230, the real-time resource allocation framework computing system 104 may predict expected values for each parameter, under different loading conditions for the enterprise network. For example, the real-time resource allocation framework computing system 104 may predict parameter values under low loading conditions, medium loading conditions and high loading conditions.

Once the predicted parameter values are generated for all atomic code blocks associated with one or more applications, the real-time resource allocation framework computing system 104 may enable smart contracts for verification of predicted parameter values and identified use of computing resources based on the predicted parameter values at 235. The smart contract may be incorporated in a distributed (or centralized) ledger computing system, such as within a blockchain. For example, each block in the blockchain may be associated with a particular atomic code block and/or each blockchain may be associated with an application comprising a plurality of atomic code blocks. The blockchain may be associated with a smart contract for an application, a smart contract for one or more atomic code blocks, a smart contract associated with a plurality of atomic code blocks for providing a function, and/or the like. At 240, based on a smart contract execution, such as by an associated user or other responsible party, the real-time resource allocation framework computing system 104 may create containers to test operation of each atomic code block in one or more computing environments, where the real-time resource allocation framework computing system 104 may certify the predicted parameter values for each atomic code block and communicate the information to stake holders, such as via the blockchain at 245.

At 250, a smart contract is generated for approval of identified resource requirements for atomic code block operation of an application by a group of stake holders, super users, and/or other users, such as via a blockchain. In some cases, the group of stakeholders may be organized as a decentralized autonomous organization (DAO) for administering a particular application or group of applications, where members may be an appraiser, an application owner, one or more members of a resource team, a representative of a business organization utilizing a particular service, and/or the like. In some cases, the smart contract may include rules for distributing voting rights regarding operation of the application based on available resources. These rules may be recalibrated with each run of the application based on historical data, where each group's voting rights may be differently weighted based on feedback on whether the smart contract is executed as expected or not. At 255, the real-time resource allocation framework computing system 104 may verify resource availability for one or more applications based on a schedule and may reserve resources based on application priorities. At 260, the real-time resource allocation framework computing system 104 may automatically generate an action plan for each code block of an application that utilizes network resources. At 265, the real-time resource allocation framework computing system 104 may generate an operation order in real time for one or more services and/or applications based on the action plan and may perform, at 270, real-time resource management for all applications operating on enterprise network resources. At 275, the real-time resource allocation framework computing system 104 may run each code block by acquiring resources, running the code, and releasing resources as needed. The real-time resource allocation framework computing system 104 may then, at 280, collect resource use statistics and automatically update the action plan and/or perform real-time training of the resource utilization models. Runtime feedback may also be used by the real-time resource allocation framework computing system 104 when generating the action plan and/or certifying predicted parameter values for each atomic code block.

FIG. 3 shows an illustrative process 300 for identifying atomic code blocks of any code base and setting parameters for real-time prediction of computing resource usage, in accordance with one or more example arrangements. For example, an application code repository 305 may store versions of code for one or more applications, services, and/or the like. The crawler 310 may monitor or otherwise crawl the application code repository 305 to identify changes to a code base of an application or service. The crawler 310, or other component of the real-time resource allocation framework computing system 104, may identify atomic code blocks associated with an application that is associated with a code change or version change. The real-time resource allocation framework computing system 104 may also associated resource use parameters to each atomic code block. In some cases, each atomic code block may be associated with a block in a blockchain, where the blockchain corresponds to a product or service code base. An AI/ML prediction engine 320, such as the code analysis engine 150-1, may analyze code associated with an application that is stored in the application code repository 305. In some cases, the code analysis engine 150-1 may manage multiple versions of code that may be used in multiple applications. In some cases, atomic code blocks for different versions of an application may be the same (e.g., no changes) or different (e.g., including changes in version control), where unchanged atomic code blocks retain parameter values updated following a last analysis. The AI/ML prediction engine 320 may perform NLP-based analysis of code retrieved from the application code repository. For example, the NLP-based analysis may include lexical analysis of code segments of an application, syntactic analysis of code segments, and semantic analysis of the code segments to identify code operations and then the AI/ML prediction engine 320 may then perform an output transformation to identify atomic code blocks corresponding to actions and/or other functionalities performed by computing devices when processing the code when providing the programmed product, application, and/or service. Along with identification of the code blocks, (e.g., code blocks 1-3), the NLP analysis may determine initial parameter value estimates for determining predicted resource usage during operation. For example, the AI/ML prediction engine 320 may determine that code block 1 requires an estimated 2 CPU cycles to operate, is exposed to an elevated network security risk and consumes memory, code block 2 may require 10 GPU cycles, and consumes memory, and Code block n requires 2 TPU cycles and HDD access. In some cases, coded functionality and/or service functionality may be leveraged when identifying resource requirements. For example, CPU cycles may be predicted for general computing functionality, GPU cycles may be predicted for image processing functionality, and TPU cycles may be predicted for machine learning functionality identified in a code block.

At 330, the AI/ML prediction engine 320 may predict network use parameter values, and/or security risk by running code blocks within a controlled environment (e.g., a sandbox environment, a simulated network environment, a virtual machine environment, and/or the like). For example, the AI/ML prediction engine 320 may load each code block into the selected controlled environment, close ports and/or network access to the controlled environment (e.g., a virtual server, a physical server device, and the like), where the code may be run with the ports closed, network access disabled and/or with network access open and/or the ports open to determine potential risk from outside influence (e.g., malicious actors, malware, and the like) via network communications and/or I/O access. At 340, the AI/ML prediction engine 320 may identify predicted values for various parameters for each code block, such as processor (e.g., CPU, GPU, TPU, and the like) parameter values, risk parameters, I/O parameters and the like. Once predicted, the values may be stored in a block and associated with a smart contract 350. Each code block may be loaded into one or more computing environments (e.g., cloud computing environments 360) for operation based on pre-configured and/or predicted resource values to identify operational characteristics of each code block in a low resource use environment, a medium resource use environment, and/or a high resource use environment. The AI/ML prediction engine 320 may compare operation of a particular code block in each of the low, medium, and high resource use environments to generate predicted values for each code block, where the predicted values may be stored in a data repository and may be associated with the corresponding code block and/or application utilizing the code block. For example, data may be stored in tabular format, such as in table 370, where each code block is associated with an application and/or a module and where each parameter (e.g., risk, processor, I/O, memory, SLA time, and/or the like) may be associated with a predicted value. In some cases, a code block or code blocks associated with particular functionality, may have instances associated with multiple application and/or modules, where each instance is associated with different predicted parameter value sets.

FIG. 4 shows an illustrative process 400 for preloading of cache information and risk mitigation for managing network resources in accordance with one or more aspects described herein. A table of predicted parameter values for atomic code blocks associated with an application (e.g., table 370) may be loaded by an appraisal processor and memory framework 410 and where analysis may be initiated via smart contract execution via interaction via one or more user devices. Once initiated, the framework 410 may order resources in real-time with a buffer with respect to SLA times as predicted for operation on a cloud computing system and/or an infrastructure system 450. Additionally, the framework may enable risk mitigation measures based on one or more predicted levels of risk associated with the code blocks, where the risk mitigation measures may include enablement of security scan(s), enabling and/or disabling of ports, and encrypting and/or decrypting data or other communications, at 430. At 440, the framework 410 may pre-load caches (e.g., the L1 cache, the L2 cache, the L3 Cache from RAM and/or from a drive (e.g., a SDD or an HDD). The processor (e.g., a CPU, GPU, TPU, and the like) may access one rom ore pre-loaded caches. For example, a first pre-loaded cache may be pre-loaded with data selected from a first table and/or a second pre-loaded cache may be preloaded with data selected from a second table. Following any preloading, the processor may process code associated with each code block associated with the application under test, where data from an actual job may be loaded into caches as needed during operation, where the framework 410 monitors operation to identify whether processing may be performed more easily with (or without) preloading of data, and identifying which data (if any) may be preloaded to enable the most efficient processing of the code. Once the atomic code blocks of the application or service have been run, and/or a threshold time (e.g., an SLA time) has elapsed, the framework 410 ensures the cache(s) have been cleaned to prepare for the next operation. In some cases, the framework 410 may store parameters associated with preloading and/or clearing caches to enable more efficient processing of code.

Figure 7:
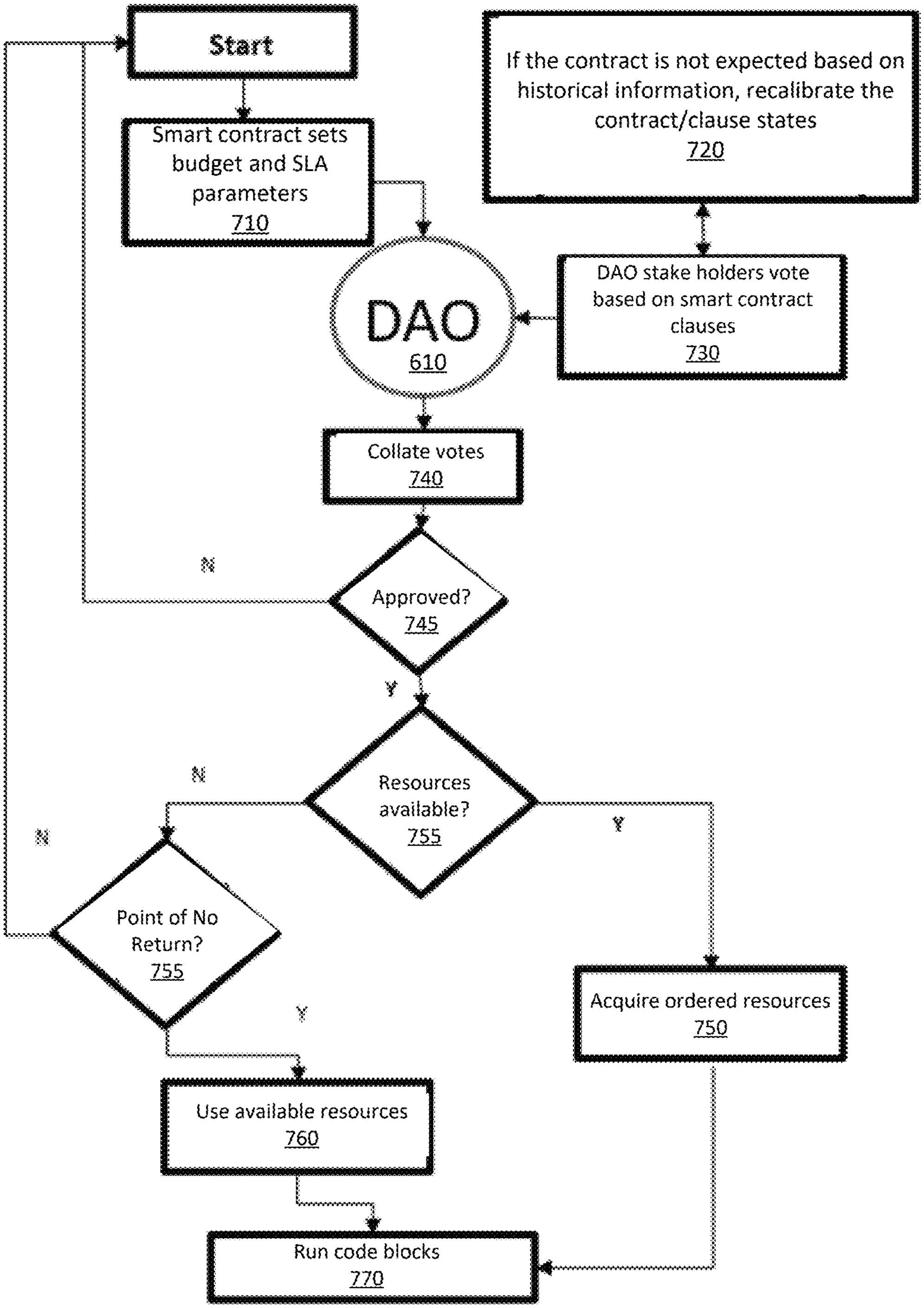

FIG. 5 shows an illustrative process for smart contract-based ordering and tracking of resources in real-time in accordance with one or more aspects described herein. As discussed above, the framework 410 may predict resource parameter values and store them in the table 370. Resource requirement information may be stored in a block in a blockchain, along with the smart contract 350. In some cases, the block may store pointers to memory locations (e.g., data repository entry information) for each atomic code block of an application. Upon running (both test and actual operations) of the application, a new block may be generated and added to the blockchain, where the new block includes resource use information (e.g., parameter values), runtime information, system load information, and the like. Such information may be used to retrain the parameter estimation and prediction models, the resource prediction, scheduling of operation of each application, and the like. Responsible users may vote on operation priorities identified for each application via the smart contract (as shown in FIGS. 6 and 7). In some cases, if consensus has not been reached, or the smart contract has not been approved within a threshold time, the application will be scheduled to run based on previously identified parameters and scheduling weighting values. At 517, the framework 410 may verify resource availability to schedule operations of the application(s). For example, the framework 410 may order resources and schedule operation of each atomic code block of the applications based on nearest real-time calculations. At 519, the framework may process a resource pre-load calculation algorithm to calculate a time to preload data into one or more cache's, time for enabling/disabling ports and/or network connections, times to perform encryption and/or decryption, and the like. Such times may be stored in a block in the blockchain associated with the application or service. Additionally, the framework may determine and schedule required resources to operate each atomic block (in a sequence) and based on an order of operation of the atomic blocks and with respect to other applications and/or services operating on the same resources. Once scheduled, the framework with initiate operation of the atomic code blocks at 523 by blocking time, acquiring data, running the code, and cleaning and releasing the caches. At 533, the framework 410 may collect operational statistics regarding resource use and/or operational times during operation of the code blocks that provide the functionality of the application or service. Additionally, the framework 410 may also log system load information and associate a time of day and/or day of week to the system load information for use when predicting system load parameter values for each code block.

FIGS. 6 and 7 show an illustrative process for smart contract approval and real-time resource management in accordance with one or more aspects described herein. The smart contract 50 may be associated with an application, an application owner (e.g., and other responsible groups of individuals, and may include one or more approval rules. When initiated, a contract approval request may be sent to a group for approval, such as a DAO. In an illustrative example, the DAO 610 may comprise multiple groups including an application owner, a business unit that utilizes the application, an appraiser, a resource team, and the like. In some cases, one or more individuals belonging to each group may have an opportunity to approve or reject a smart contract approval request associated with resource allocations for running the application or service. As part of the approval, voting rights of all involved stakeholders may be recalibrated each contract approval cycle, based on feedback from previous approval cycles. For example, an increase or decrease in each group's weighting points may be based on the feedback loop of whether the smart contract is executed as expected, or not. In some cases a smart contract may have approval weights assigned based on a contract type (e.g., a resource budget contract, a SLA contract, and the like) as shown in chart 620. Chart 630 shows an illustrative rule set (e.g., stakeholder clauses) that may influence an impact of each group's voting rights on the ultimate approval of the smart contract.

FIG. 7 shows an illustrative process for approving smart contracts. At 710, a smart contract may set a resource budget and/or SLA parameters, where the resource budget comprises predicted resource utilization values for each atomic code block of an application or service and communicates the smart contract to a DAO 610 for approval. At 720, if the contract is not expected based on historical information, the smart contract is recalibrated and/or the clauses may be revised. At 730, DAO stakeholders vote on the smart contract approval base on the smart contract clauses, where the smart contract clauses set a percentage of influence for each group towards the total approval threshold of the contract. At 740, the votes are collated based on the weightings to see whether the contract is approved (e.g., a weighted total of approval votes meeting a defined threshold value) at 745. If, at 745, the smart contract is not approved, the smart contract is returned to have the parameter values to be revised at 710. If, at 745, the contract is approved, the framework 410 (e.g., the real-time resource allocation framework computing system 104) identifies whether the resources are available, as defined in the parameters at 755. If so, the real-time resource allocation framework computing system 104 acquires the ordered resources at 750 and initiates running of the atomic code blocks of the application or service. If, at 755, resources are not available, the real-time resource allocation framework computing system 104 calculates whether a "point of no return" condition has been met, such as when the available resources, even when delayed, would not allow the application or service to complete and/or the application may time out or otherwise experience errors caused due to lack of resource availability. If not, the real-time resource allocation framework computing system 104 may recalculate parameters values at 710. If so, the real-time resource allocation framework computing system 104 may cause execution of the atomic code blocks of the application or service at 760 and 770.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:

a version control system storing executable code associated with a plurality of services;

a computing device, comprising:

a processor; and non-transitory computer readable media storing instructions that, when executed by the processor, cause the computing device to:

identify first executable code associated with a first service of the plurality of services;

identify, automatically by a natural language processing engine, a plurality of atomic code blocks from the first executable code, wherein the plurality of atomic code blocks, when executed, cause the first service to be executed;

predict, by a machine learning-based prediction algorithm, values for a plurality of computing resource parameters corresponding to computing resources consumed by each atomic code block of the plurality of atomic code blocks;

store, in a smart contract associated with the first service, the computing resource parameter values;

based on approval of the smart contract:

pre-load cache information based on runtime information associated with each atomic code block;

execute, by a computing device, the first service, wherein computing resources for the first service are allocated based on a sequence of operation of the atomic code blocks and the predicted computing resource parameter values;

generate, in a blockchain associated with the first service, one or more new blocks storing information corresponding to actual runtime computing resources consumed by each atomic code block when executing the first service; and adapt, based on the one or more new blocks, the machine learning-based prediction algorithm to improve prediction for computing resources consumed by each atomic code block of the first service.

2. The system of claim 1, wherein the plurality of computing resource parameter values comprises two or more of a processor utilization parameter, a memory utilization parameter, a network access parameter, a input/output access parameter, a network security risk parameter, and a cloud computing resource time parameter.

3. The system of claim 1, wherein the information corresponding to actual runtime computing resources consumed by each atomic code block when executing the first service comprise the plurality of computing resource parameters and one or more of day of week information, time of day information, resource required information, usage information, duration information, risk scope details, and network maintenance activity information.

4. The system of claim 3, wherein the information corresponding to actual runtime computing resources consumed by each atomic code block when executing the first service includes identification of at least one second service operational on the computing resources.

5. The system of claim 1, wherein the instructions further cause the computing device to:

identify latency issues corresponding to historical cache hit ratios; and identify the pre-load cache information to be pre-loaded in a cache to overcome the latency issues.

6. The system of claim 1, wherein the instructions cause the computing device to perform lexical, syntactic, and semantic natural language processing of code associated with the first service to identify the plurality of atomic code blocks.

7. A method comprising:

identifying, via a crawler, changed first executable code stored in a version control system that is associated with a first service of a plurality of services;

identifying, automatically by a natural language processing engine, a plurality of atomic code blocks from the first executable code, wherein the plurality of atomic code blocks, when executed, cause the first service to be executed;

predicting, by a machine learning-based prediction algorithm, values for a plurality of computing resource parameters corresponding to computing resources consumed by each atomic code block of the plurality of atomic code blocks;

storing, in a smart contract associated with the first service, the computing resource parameter values;

based on approval of the smart contract:

pre-loading cache information based on runtime information associated with each atomic code block;

executing, by a computing device, the first service, wherein computing resources for the first service are allocated based on a sequence of operation of the atomic code blocks and the predicted computing resource parameter values;

generating, in a blockchain associated with the first service, one or more new blocks storing information corresponding to actual runtime computing resources consumed by each atomic code block when executing the first service; and adapting, based on the one or more new blocks, the machine learning-based prediction algorithm to improve prediction for computing resources consumed by each atomic code block of the first service.

8. The method of claim 7, wherein the plurality of computing resource parameter values comprises two or more of a processor utilization parameter, a memory utilization parameter, a network access parameter, an input/output access parameter, a network security risk parameter, and a cloud computing resource time parameter.

9. The method of claim 7, wherein the information corresponding to actual runtime computing resources consumed by each atomic code block when executing the first service comprise the plurality of computing resource parameters and one or more of day of week information, time of day information, resource required information, usage information, duration information, risk scope details, and network maintenance activity information.

10. The method of claim 7, wherein the information corresponding to actual runtime computing resources consumed by each atomic code block when executing the first service includes identification of at least one second service operational on the computing resources.

11. The method of claim 7, further comprising:

identifying latency issues corresponding to historical cache hit ratios; and identifying the pre-load cache information to be pre-loaded in a cache to overcome the latency issues.

12. The method of claim 11, further comprising performing lexical, syntactic, and semantic natural language processing of code associated with the first service to identify the plurality of atomic code blocks.

13. A computing device, comprising:

a processor; and non-transitory computer readable media storing instructions that, when executed by the processor, cause the computing device to:

identify, in a version control system, first executable code associated with a first service of a plurality of services;

identify, automatically by a natural language processing engine, a plurality of atomic code blocks from the first executable code, wherein the plurality of atomic code blocks, when executed by the processor, cause the first service to be executed;

predict, by a machine learning-based prediction algorithm, values for a plurality of computing resource parameters corresponding to computing resources consumed by each atomic code block of the plurality of atomic code blocks;

store, in a smart contract associated with the first service, the computing resource parameter values;

based on approval of the smart contract:

pre-load cache information based on runtime information associated with each atomic code block;

execute, by a computing device, the first service, wherein computing resources for the first service are allocated based on a sequence of operation of the atomic code blocks and the predicted computing resource parameter values;

generate, in a blockchain associated with the first service, one or more new blocks storing information corresponding to actual runtime computing resources consumed by each atomic code block when executing the first service; and adapt, based on the one or more new blocks, the machine learning-based prediction algorithm to improve prediction for computing resources consumed by each atomic code block of the first service.

14. The computing device of claim 13, wherein the plurality of computing resource parameter values comprises two or more of a processor utilization parameter, a memory utilization parameter, a network access parameter, an input/output access parameter, a network security risk parameter, and a cloud computing resource time parameter.

15. The computing device of claim 14, wherein the information corresponding to actual runtime computing resources consumed by each atomic code block when executing the first service comprise the plurality of computing resource parameters and one or more of day of week information, time of day information, resource required information, usage information, duration information, risk scope details, and network maintenance activity information.

16. The computing device of claim 13, wherein the information corresponding to actual runtime computing resources consumed by each atomic code block when executing the first service includes identification of at least one second service operational on the computing resources.

17. The computing device of claim 13, wherein the instructions cause the computing device to perform lexical, syntactic, and semantic natural language processing of code associated with the first service to identify the plurality of atomic code blocks.

* * * * *